United States Patent [19]
Needham et al.

[11] Patent Number: 5,889,764
[45] Date of Patent: Mar. 30, 1999

[54] LOW-LATENCY MULTI-PARTY AUDIO CHAT

[75] Inventors: Bradford H. Needham, Hillsboro; Jean M. Deagen, Portland, both of Oreg.

[73] Assignee: Intel Corporation, Santa Clara, Calif.

[21] Appl. No.: 691,623

[22] Filed: Aug. 2, 1996

Related U.S. Application Data

[63] Continuation-in-part of Ser. No. 522,068, Aug. 31, 1995, Pat. No. 5,784,568.

[51] Int. Cl.$^6$ .................................................. H04L 12/56
[52] U.S. Cl. ........................ 370/263; 370/394; 370/412; 370/474; 395/200.34
[58] Field of Search .................................... 370/260, 263, 370/394, 412, 413, 474; 395/200.34; 379/202

[56] References Cited

U.S. PATENT DOCUMENTS

| | | | |
|---|---|---|---|
| 3,648,249 | 3/1972 | Goldsberry | 340/172.5 |
| 5,053,947 | 10/1991 | Heibel et al. | 364/200 |
| 5,127,001 | 6/1992 | Steagall et al. | 370/62 |
| 5,231,633 | 7/1993 | Hluchyj et al. | 370/94.1 |
| 5,261,059 | 11/1993 | Hedberg et al. | 395/325 |
| 5,293,378 | 3/1994 | Shimizu | 370/94.1 |
| 5,428,610 | 6/1995 | Davis | 370/73 |
| 5,471,586 | 11/1995 | Sefidvash et al. | 395/284 |
| 5,487,061 | 1/1996 | Bray | 370/252 |
| 5,530,699 | 6/1996 | Kline | 370/260 |
| 5,539,741 | 7/1996 | Barraclough et al. | 370/267 |
| 5,581,566 | 12/1996 | St. John et al. | 371/37.6 |
| 5,610,920 | 3/1997 | Doll et al. | 370/260 |
| 5,664,116 | 9/1997 | Gaytan et al. | 395/200.64 |

*Primary Examiner*—Hassan Kizou
*Attorney, Agent, or Firm*—Blakely, Sokoloff, Taylor & Zafman LLP

[57] ABSTRACT

In a receiving node coupled to a number of transmitting nodes, a method of managing audio data received from the transmitting nodes is provided. In the method, a plurality of transmissions are received by the receiving node, with each transmission representing an utterance of audio information. Each transmission is transmitted from a different one of the transmitting nodes and includes a number of audio data packets. One of the utterances is designated as a ready-to-play utterance based on an order in which the utterances were received. The data packets of any utterance designated as the ready-to-play utterance are provided to a ready-to-play queue in real time. Data packets of the other utterances are held in separate queues and are not provided to the ready-to-play queue until after the packets of the ready-to-play utterance have been provided to the ready-to-play queue. After the data packets of the ready-to-play utterance have been provided to the ready-to-play queue, a new utterance is designated as the ready-to-play utterance.

41 Claims, 16 Drawing Sheets

LOW-LATENCY MULTI-PARTY AUDIO CHAT

The present application is a continuation-in-part of application Ser. No. 08/522,068, filed on Aug. 31, 1995, now U.S. Pat. No. 5,784,568.

FIELD OF THE INVENTION

The present invention pertains to the field of audio communication using computers. More particularly, the present invention relates to audio communication between multiple parties using computers on a network.

BACKGROUND OF THE INVENTION

The Internet is a worldwide, on-line computer network of computers connecting governments, companies, universities, and other networks and users. The Internet began in 1984 with funding from the U.S. government. Originally open only to government and university researchers, it is now open to anyone. The Internet and online information services provide electronic mail, conferencing, and chat services, as well as the ability to access remote computers for sending and retrieving files.

One of the most popular features of the Internet and On-line services is on-line "chat". Chat is informal communication among users of the Internet. The chat feature allows two or more people to converse by sending text messages back and forth through a "chat room" that is accessed via the on-line service. Only those connected to the on-line service can participate in the chat.

The Internet provides a relatively slow link between users of the network. Information is transmitted across the Internet in packets which are self-contained blocks of information containing data and control information. The transmitted information is split up into individual packets, transferred across a communications link, and then reassembled at the receiving end. Because the Internet is a packet-switched network, rather than a circuit-switched, network, and because the links between computers are often heavily loaded, the delay between sender and receiver can be quite large compared to instantaneous telephone or face-to-face conversation.

In view of this large delay, the social norm of speaking only during silence becomes difficult to maintain. When the receiver encounters silence, the sender may already be in the middle of composing or speaking a new sentence. This problem is compounded when attempting a multi-party conversation. Current Internet real-time audio programs do not address this problem of interrupting the speaker.

It is, therefore, desirable to provide a method of handling conversations over a slow medium that prevents one participant in a conversation from interrupting another participant. It is further desirable to implement such a method in a manner which prevents long periods of silence while an individual chat participant is speaking.

SUMMARY OF THE INVENTION

A method is provided, in a receiving node coupled to a number of transmitting nodes, of managing data received from the transmitting nodes. In the method, a number of transmissions are received by the receiving node. Each transmission is transmitted from a different one of the transmitting nodes and includes a number of data packets. One of the transmissions is designated as a ready-to-output transmission. The data packets of the ready-to-output transmission are provided to an output queue in real time. The other transmissions are not provided to the output queue until after the packets of the ready-to-output transmission have been provided to the output queue.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method is described of, in a receiving node, managing data received from a plurality of transmitting nodes. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to avoid unnecessarily obscuring the present invention.

Figure 1:
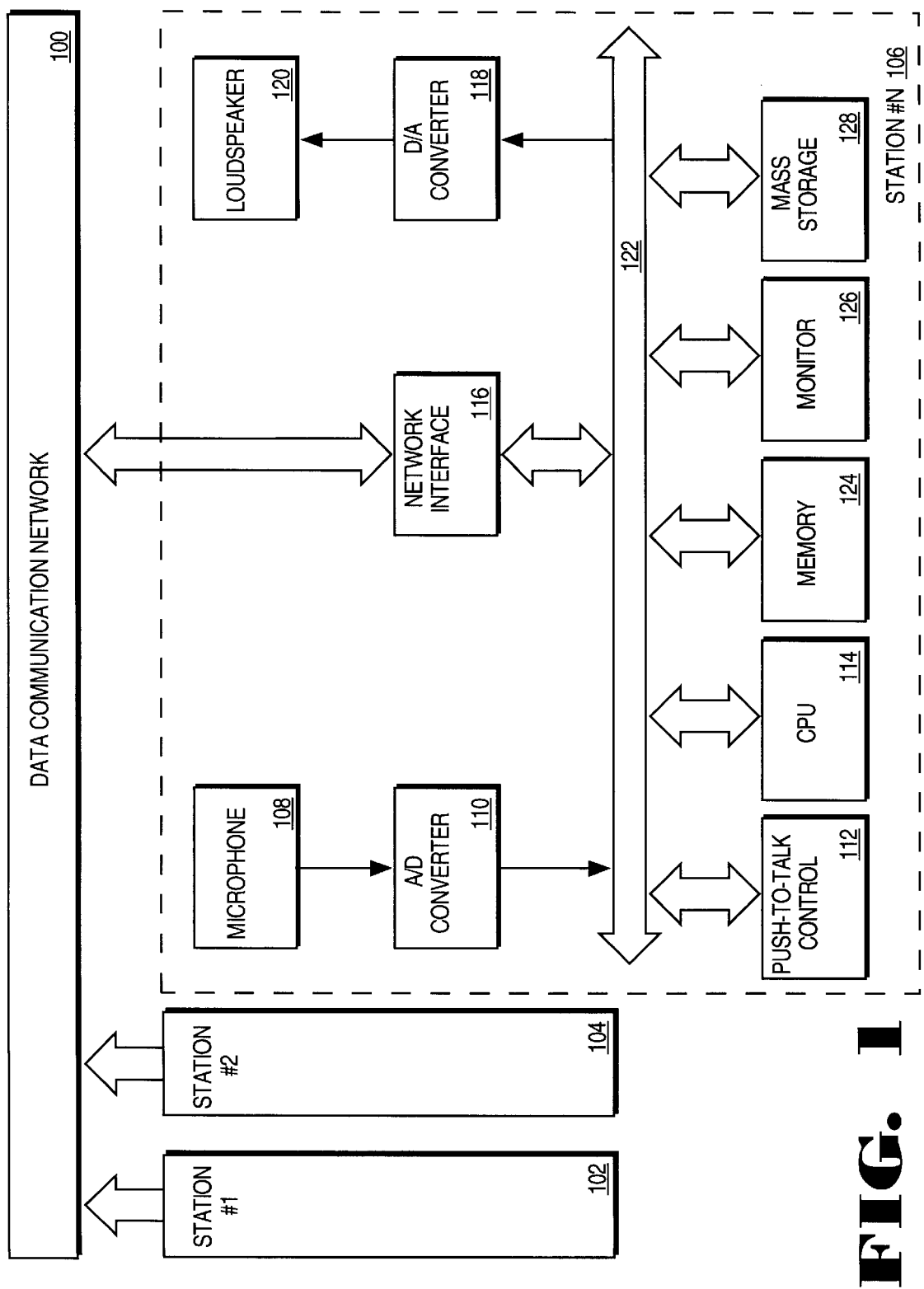
FIG. 1 illustrates a communication system in which the present invention can be implemented.

FIG. 1 illustrates a communication system in which the present invention can be implemented. A number N of stations 102, 104, and 106 are connected to a data communications network 100. In one embodiment, the stations 102, 104, and 106 are personal computers, and participants at each personal computer communicate over a telephone network with an on-line service that provides Internet access. The on-line service provider transmits the conversations to each station. Each station accommodates both text and audio chat. The audio packets may be transmitted over the data communications network 100 in the form of compressed audio.

Each station in FIG. 1 comprises a microphone 108, an analog-to-digital (A/D) converter 110, a push-to-talk control 112, a network interface 116, a digital-to-analog (D/A) converter 118, a loudspeaker 120, a central processing unit (CPU) 114, a memory 124, a monitor 126, and a mass storage device 128. The A/D converter 110, the network interface 116, the D/A converter 118, the push-to-talk control 112, CPU 114, memory 124, the monitor 126, and the mass storage device 128 are each coupled to a bus 122. The network interface 116 is also connected to the data communications network 100. Microphone 108 provides analog audio data to the A/D converter 110. The D/A converter 118 provides analog audio output to loudspeaker 120.

A/D converter 110 can be an audio digitizer. Similarly, D/A converter 118 can be an audio player. The mass storage device 128 can be a magnetic or optical storage device or any other suitable storage medium. The push-to-talk control 112 can be any physical control that indicates that the station's user is currently speaking. In one embodiment, the push-to-talk control 112 is implemented as a push-button controlled by a mouse as part of a graphical user interface. Alternative embodiments of the push-to-talk control 112 include a function key on a keyboard, hands-free audio processing software that determines that a person is speaking, a foot switch, a voice-actuated switch, or other special mechanical switch.

In one embodiment, the network interface 116 includes a telephone modem that connects station 106 to an Internet service provider. The data communications network 100 in this instance is the Internet. In an alternative embodiment, the network interface 116 is an Ethernet card and the data communications 100 is a corporate wide area network (WAN) which connects physically dispersed offices of a corporation. In another embodiment, the network interface 116 is a radio frequency (RF) modem and the data communications network may be an RF network, such as the type commonly used by truck dispatchers.

The present invention is related to the use of a computer system, such as station 1 of FIG. 1, to receive transmissions of audio data from another computer system. According to one embodiment, the present invention is implemented by station 106 in response to CPU 114 executing sequences of instructions contained in memory 124. That is, execution of the sequences of instructions contained in memory 124 causes CPU 114 to receive audio transmissions in a multiparty chat session in a manner that reduces overall latency, as will be described.

The instructions may be loaded into memory 124 from a persistent store, such as mass storage device 128, and/or from one or more other computer systems (collectively referred to as a "host computer system") over a network connection. For example, a host computer system may transmit a sequence of instructions to station 106 in response to a message transmitted to the host computer system over a network by station 106. As station 106 receives the instructions over the network connection, station 106 stores the instructions in memory 124. Station 106 may store the instructions for later execution or execute the instructions as they arrive over the network connection. In some cases, the downloaded instructions may be directly supported by CPU 114. Consequently, execution of the instructions may be performed directly by CPU 114. In other cases, the instructions may not be directly executable by CPU 114. Under these circumstances, the instructions may be executed by causing CPU 114 to execute an interpreter that interprets the instructions, or by causing CPU 114 to execute instructions which convert the received instructions to instructions which can be directly executed by CPU 114.

In alternative embodiments, hardwired circuitry may be used in place of, or in combination with, software instructions to implement the present invention. Thus, the present invention is not limited to any specific combination of hardware circuitry and software, nor to any particular source for the instructions executed by station 106.

Figure 2:
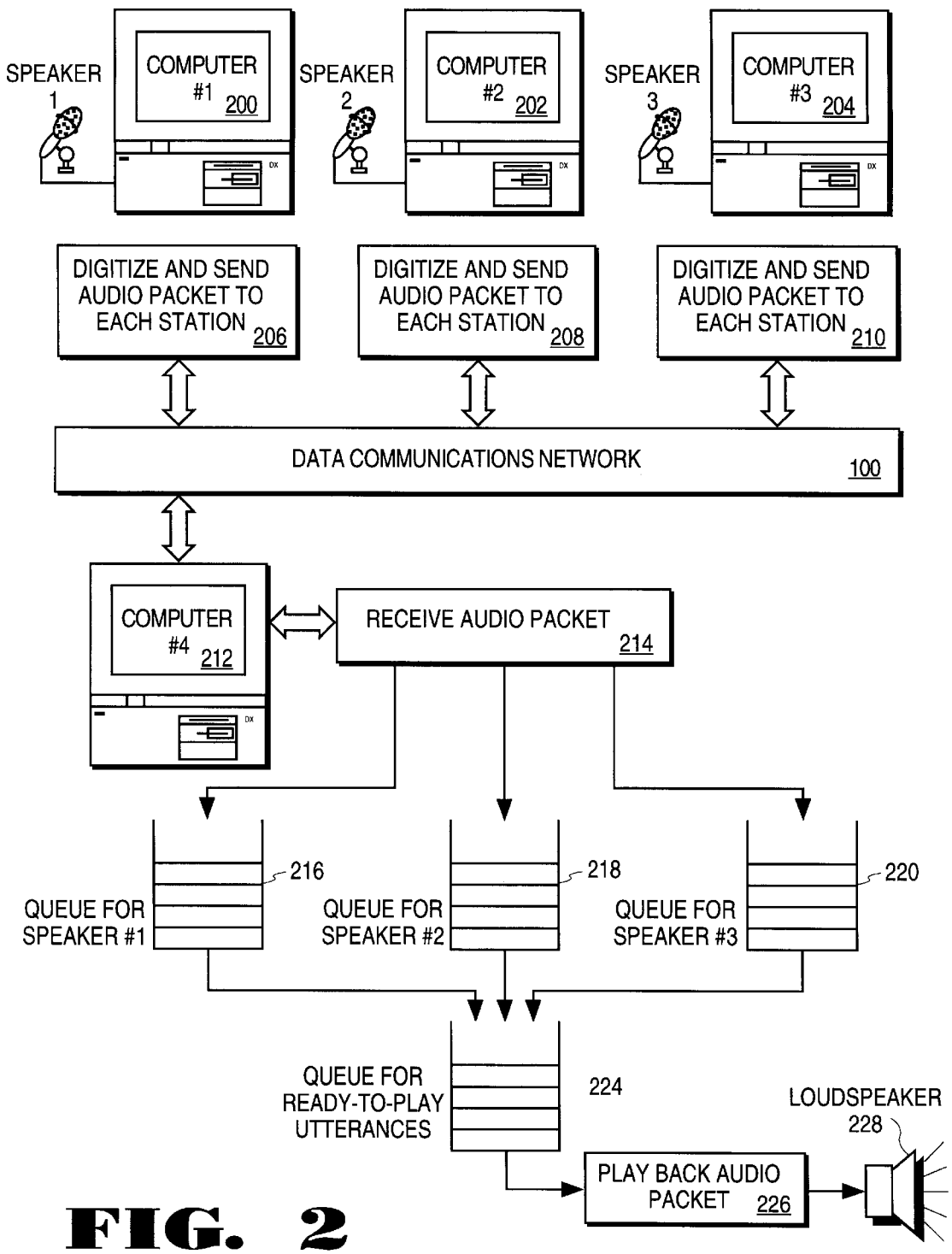
FIG. 2 illustrates data flow through a communication system in which the present invention can be implemented.

FIG. 2 illustrates the data flow through the communication system of FIG. 1 from microphone to loudspeaker. In the example of FIG. 2, three chat participants, Speaker 1, Speaker 2 and Speaker 3, are talking into microphones at their respective computers 200, 202, and 204. Each computer digitizes and sends an audio packet 206, 208, and 210 to each other station, including a fourth computer 212, over the data communications network 100. Although each computer receives the audio, only the process performed by computer 212 will be described for purposes of illustration. However, it should be recognized that the same process occurs at all other participating stations.

Referring still to FIG. 2, the audio packet is received 214 and is appropriately placed in the queue for speaker number one 216, the queue for speaker number two 218, or the queue for speaker number three 220, depending upon the source identification (ID) that accompanies the audio packet. When an end-of-utterance packet is received at a queue, the total contents of that queue (one complete utterance) is transferred to the output queue, i.e., the ready-to-play queue 224. When the ready-to-play queue 224 is not empty, playback of the audio packets takes place 226 and can be heard at the loudspeaker 228. Consequently, the ready-to-play utterances (utterances in the ready-to-play queue) are played in order, without mixing.

Figure 3:
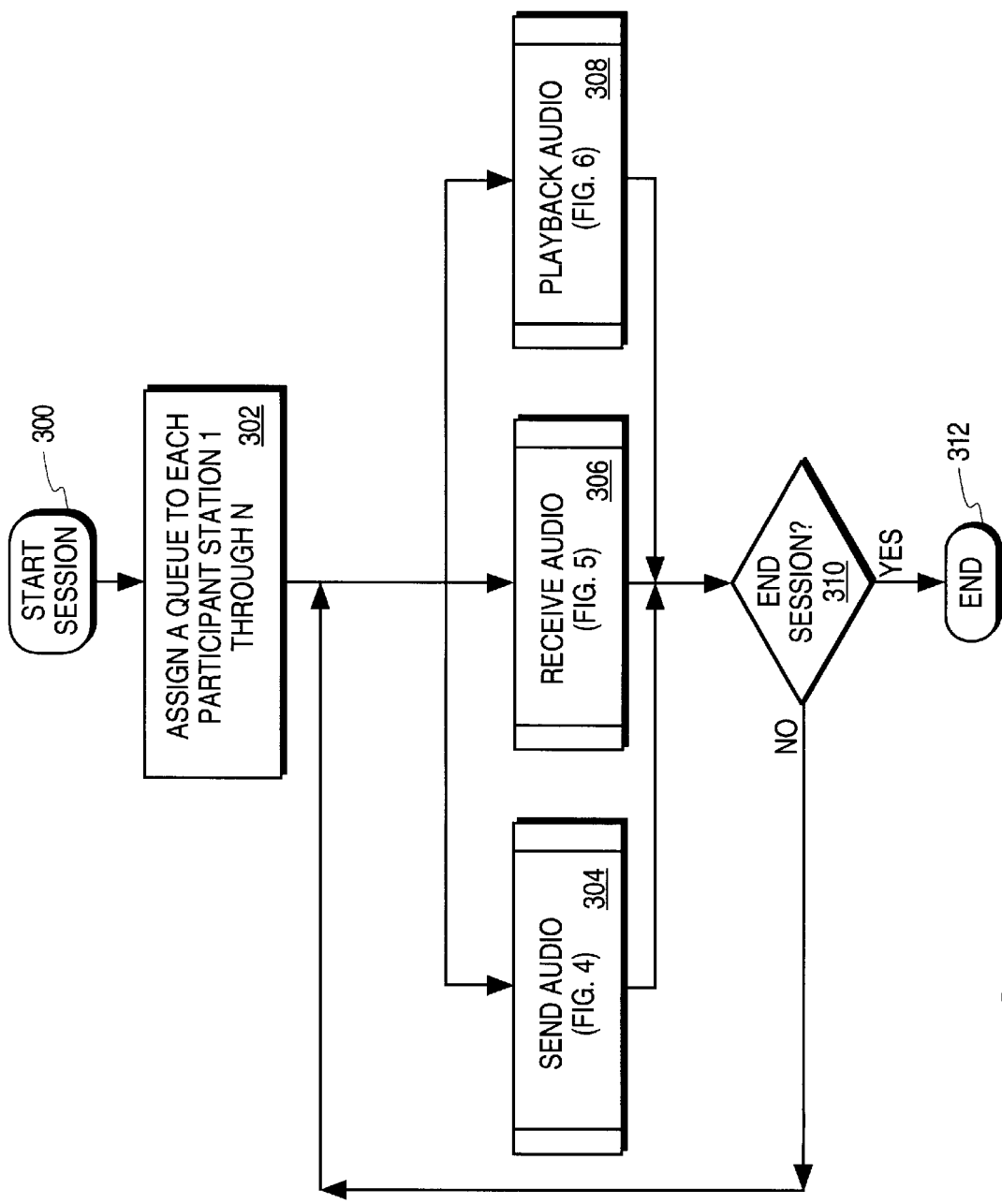
FIG. 3 is a flow diagram illustrating an overall routine for implementing a chat session.

FIG. 3 illustrates an overall routine for implementing a chat session. The routine includes the transmission reception and playback of an audio chat session in accordance with the present invention. A chat session starts (step 300), and at initialization, a queue is assigned to each participant in the chat session at each of several participating stations 1 through N (step 302). Three processes occur simultaneously within each station in the system: send audio data (step 304), receive audio data (step 306), and playback audio (step 308). These processes are described in detail in FIGS. 4 through 6, respectively. The three processes continue until an end of session is signaled (step 310), at which time the chat session ends (step 312).

Figure 4:
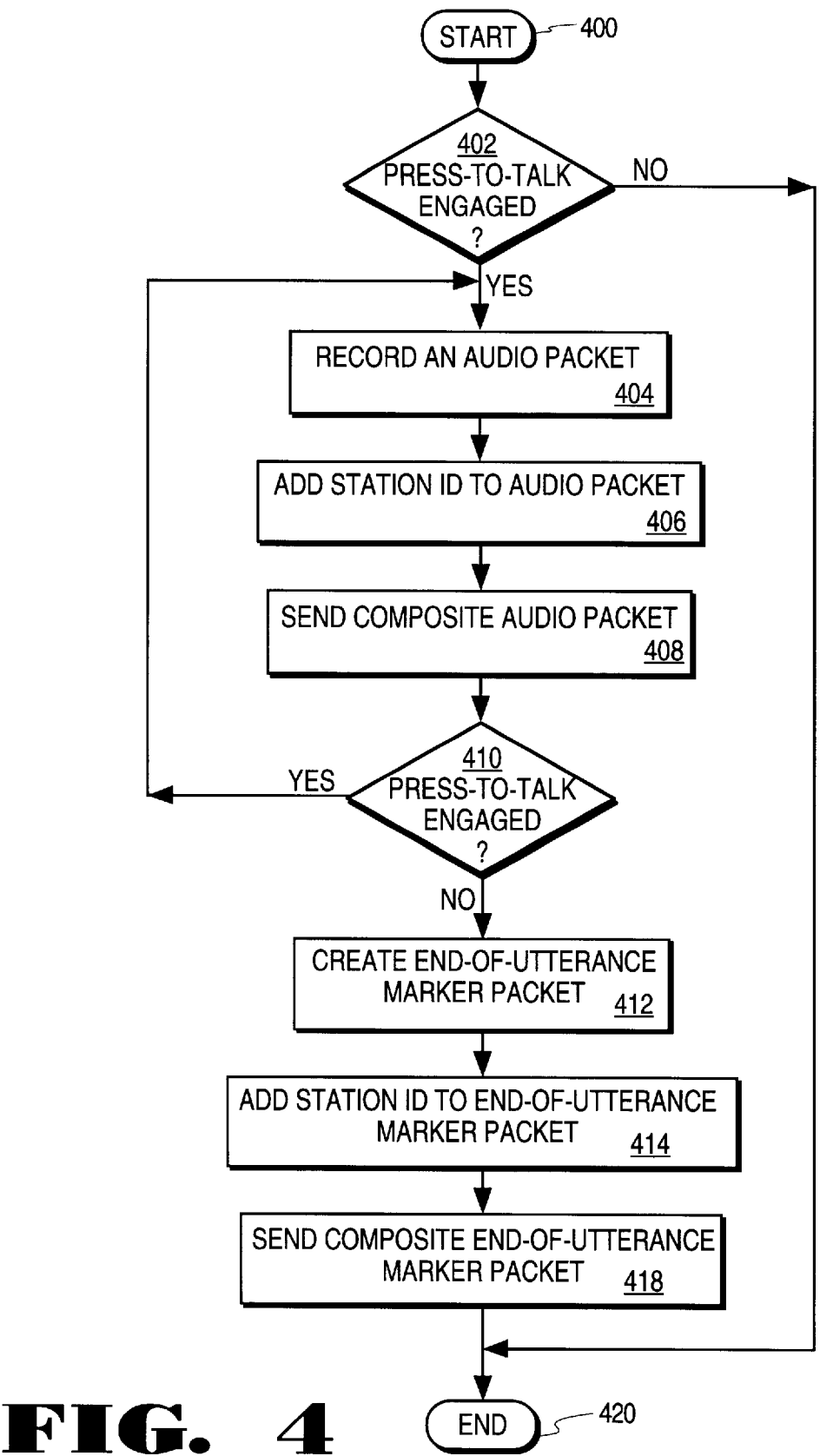
FIG. 4 is a flow diagram illustrating a routine for sending audio to a receiving station.

FIG. 4 illustrates a routine implemented in a transmitting station for sending audio to a receiving station. In FIG. 4, the routine starts (step 400), and when the push-to-talk control 112 is engaged (step 402) an audio packet is recorded (step 404). The station ID of the transmitting station is then added to the audio packet (step 406), and the composite audio packet is sent (step 408). This process repeats until the push-to-talk control 112 is released. In response to the push-to-talk control 112 being released (step 410), an end-of-utterance marker packet is created (step 412). The station ID is added to the end-of-utterance marker packet (step 414), and the composite end-of-utterance marker packet is transmitted (step 418). The process then returns (step 420) to the flow of FIG. 3.

Figure 5:
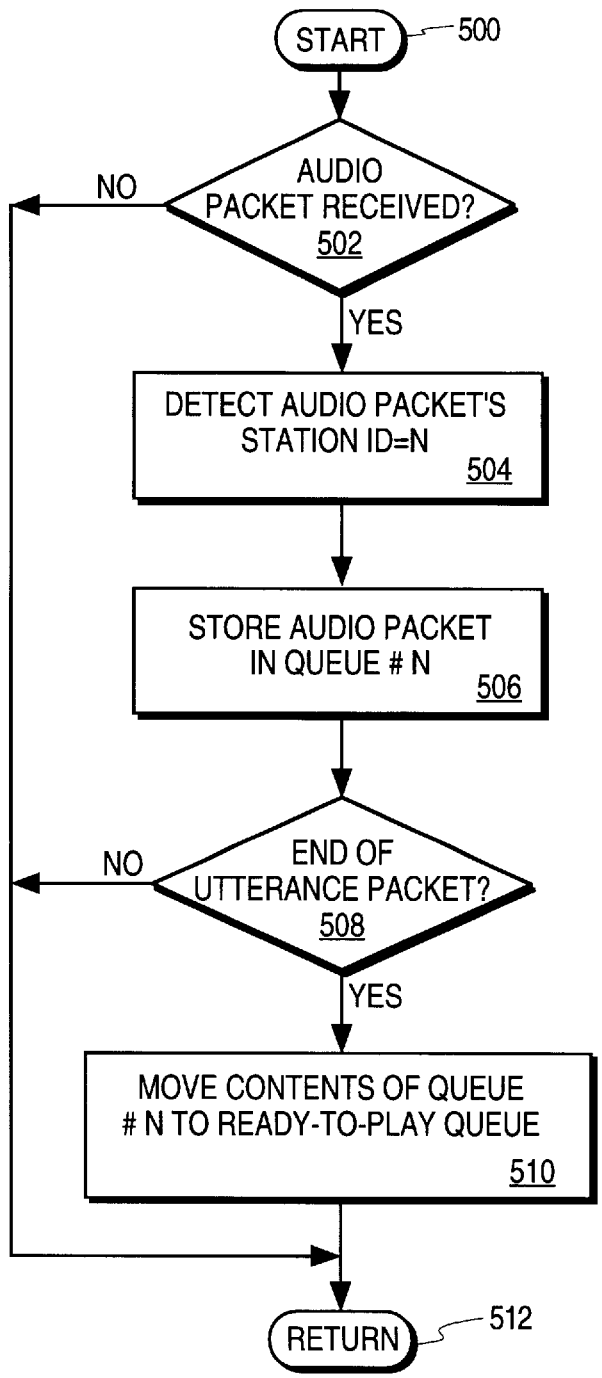
FIG. 5 is a flow diagram illustrating a routine for receiving audio data.

FIG. 5 illustrates a routine for receiving audio data performed by a receiving station. The routine of FIG. 5 begins (step 500), and if a composite audio packet from one of the speakers (speaker N) is received (step 502), then the packet's station ID is detected (step 504). The audio packet is stored in a queue #N dedicated to the speaker #N (step 506) corresponding to the detected station ID. If the received packet is an end-of-utterance marker packet (step 508), then the entire contents of the queue to which the end-of-utterance marker packet pertains is moved from the audio packet queue to the ready-to-play queue 224 (step 510), and the process returns (step 512) to the flow of FIG. 3.

Figure 6:
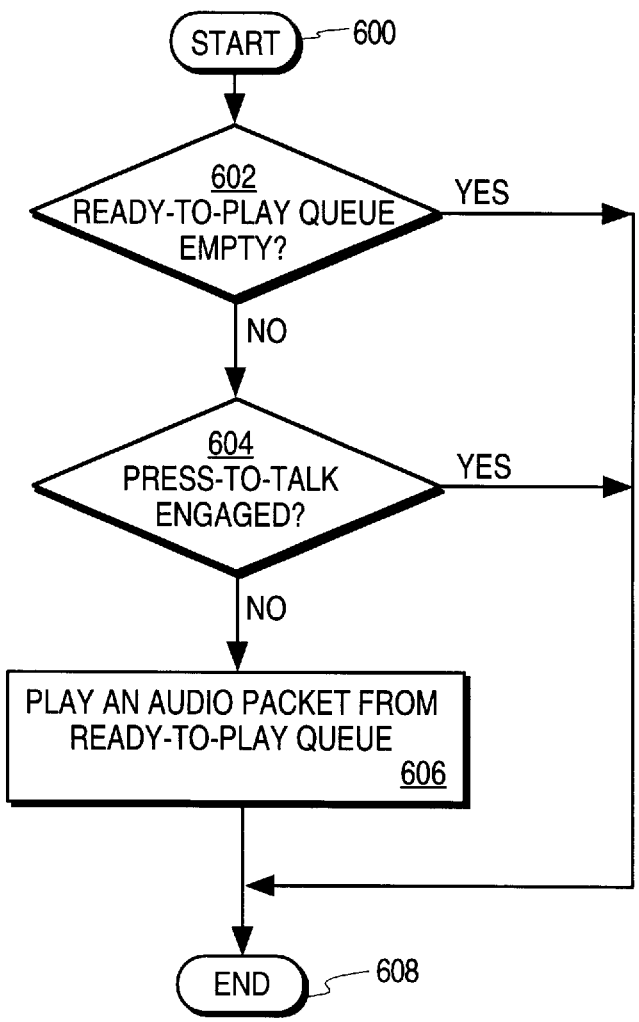
FIG. 6 is a flow diagram illustrating a routine for audio playback.

FIG. 6 illustrates a routine for performing audio playback. If a complete utterance is in the ready-to-play queue (step 602) and the speaker at the receiver is not talking, that is, the push-to-talk control 112 is not engaged (step 604), then an audio packet is played back from the ready-to-play queue (step 606). If the receiver is talking, the push-to-talk control 112 is engaged (step 604), and the audio playback is paused until the push-to-talk control 112 becomes disengaged. After playing one audio packet from the ready-to-play queue 224 (step 602), the process returns (step 608) to the flow of FIG. 3.

Hence, what has been described thus far is a method of communicating among participants at N participant stations. In Figure 1, the participant stations 102, 104, and 106 are connected via the data communications network 100. In FIG. 3, at each participant station, N audio packet queues are assigned to each participant station (step 302). In FIG. 4, when a push-to-talk control 112 at a transmitting station is engaged (step 402), an audio packet is recorded (step 404). The audio packet is combined with a station ID to form a composite audio packet (step 406). The composite audio packet is sent over the data communications network to each participant station (step 408).

When the push-to-talk control 112 is released (step 410), an end-of-utterance marker is created (step 412) and combined with the sending station ID (step 414) to form a composite end-of-utterance marker packet. The composite end-of-utterance marker packet is sent from the transmitting station over the data communications network 100 to each of the N participant stations (step 418).

In FIG. 5, the composite audio packet is received at a receiving station (step 502). The receiving station detects the audio packet's station ID (step 504). The receiving station stores the audio packet in a queue at the receiving station (step 506), the queue being specified by the station ID. The receiving station detects (step 508) the composite end-of-utterance marker packet corresponding to the transmitting station at which the composite end-of-utterance marker packet originated. The receiving station then moves the contents of queue N from the audio packet queue to a ready-to-play queue (step 510). In FIG. 6, the audio packet is then played back from the ready-to-play queue (step 606). The playing back of the audio packet from the ready-to-play queue is prevented if a push-to-talk control 112 at the receiving station is engaged (step 604).

The above-described method is advantageous, in that it allows an audio chat session to be handled between multiple parties in the face of large transmission delays without one participant interrupting another. It will be recognized, however, that by using the above method, a given speaker is heard only when he or she has finished speaking. If, for example, one person speaks for ten seconds, he or she will not be heard for at least ten seconds after the beginning of his or her utterance. To handle this situation, therefore, an alternative method is now described to avoid long periods of silence when a single speaker speaks for a relatively long time.

This alternative method uses the concept of a "floor" and, more specifically, granting the floor to the first utterance that is received, and playing that utterance as it is received, rather than waiting until the end-of-utterance packet is received. This alternative method reduces the perceived delay at a receiving station between the audio outputs associated with different speakers.

As will be described in greater detail below, the procedure of the alternative method is as follows. Each station transmits audio as it is input to the station by a speaker. When the speaker completes an utterance (e.g., when the speaker releases the push-to-talk control 112), an end-of-utterance marker is sent by that speaker's station. Each listener receives multiple streams of audio simultaneously from all speakers. The listener's station temporarily stores each speaker's audio in a queue specific to that utterance. When an utterance is begun, a new queue is created for that utterance. When a new utterance is first granted the floor, all of its received packets are provided to the ready-to-play queue. Packets subsequently received for the utterance which has the floor are immediately transferred from the queue assigned to that utterance to the ready-to-play queue. Audio is played from the ready-to-play queue as it is received. When an end-of-utterance packet is received for the utterance which has the floor, that utterance's queue is destroyed, and the floor is reassigned, if possible. The floor is generally assigned to the oldest complete utterance. If there are no complete utterances, then the floor is assigned to the oldest incomplete utterance of length greater than Y packets, where Y is empirically determined. If there are no such utterances, then the floor remains unassigned and output stops until more speech is received. In the case that an incomplete utterance has held the floor for more than a predetermined number X of seconds without receiving a packet for that utterance, where X is empirically determined, then that utterance is considered complete, and the floor is reassigned, if possible.

Figure 7:
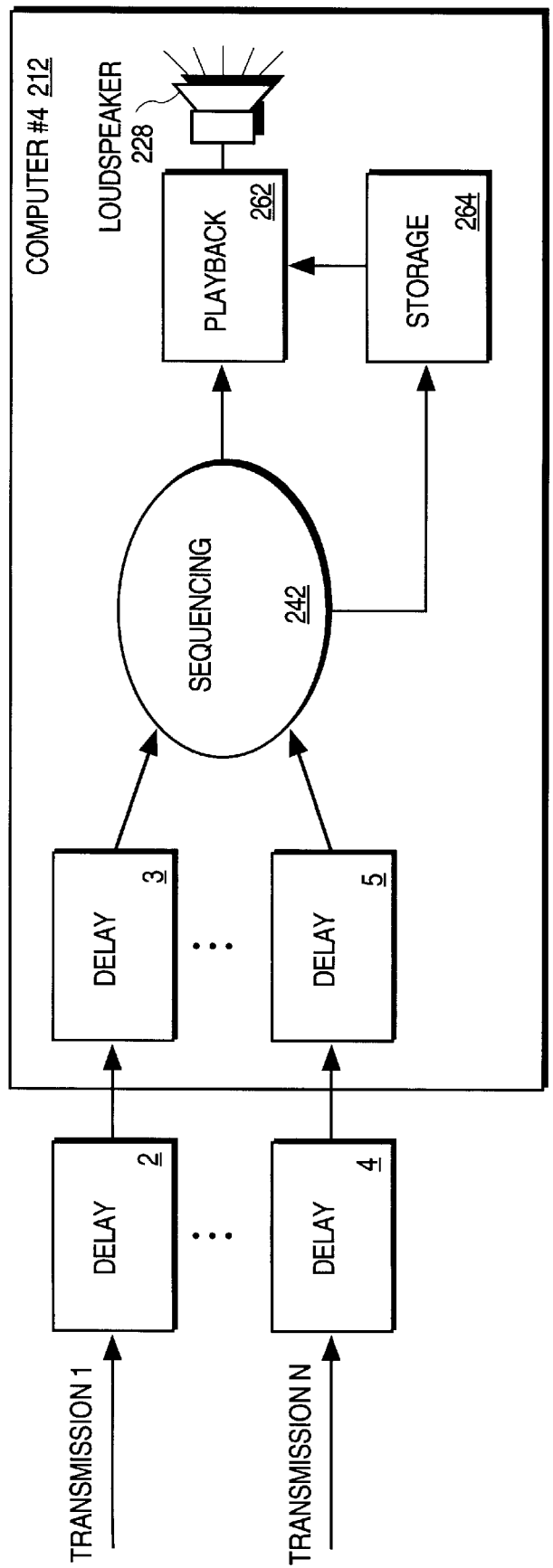
FIG. 7 is an illustration of combined hardware and software in a receiving station.

In the preferred embodiment, the floor is granted to a particular utterance based on the chronological order in which utterances are received. However, it must be noted that, because many unpredictable delays are present in a complex network such as the Internet, the time at which an utterance is considered to be "received" has the potential to be ambiguous. For example, referring to FIG. 7, various delays may be encountered by audio packets destined for a receiving station 212. In FIG. 7, station 212 is receiving N audio transmissions, each of which passes through a number of delays. These delays may occur either within or outside the receiving station 212. For example, transmission 1 passes through delay 2 outside station 212 and delay 3 within station 212. Similarly, transmission N passes through delay 4 outside station 212 and delay 5 within station 212.

Because these delays may unpredictably vary with time and be of differing lengths, the receiving station 212 includes a sequencing mechanism 242, which assigns a chronological sequence to the N transmissions with respect to a single, common time base. That is, the sequencing mechanism 242 assigns a chronological sequence to each of the received transmissions based upon the order in which these transmissions are received by the sequencing mechanism 242. Thus, in the description which follows, the order in which utterances are "received" by a receiving station refers to the sequence assigned by the receiving station's sequencing mechanism 242.

The sequenced transmissions can be immediately provided for immediate playback to a playback routine 262, which produces audio output via the loudspeaker 228. Alternatively, the sequenced transmissions can be provided from the sequencing mechanism 242 to a storage location 264 for playback at a later time.

Figure 8:
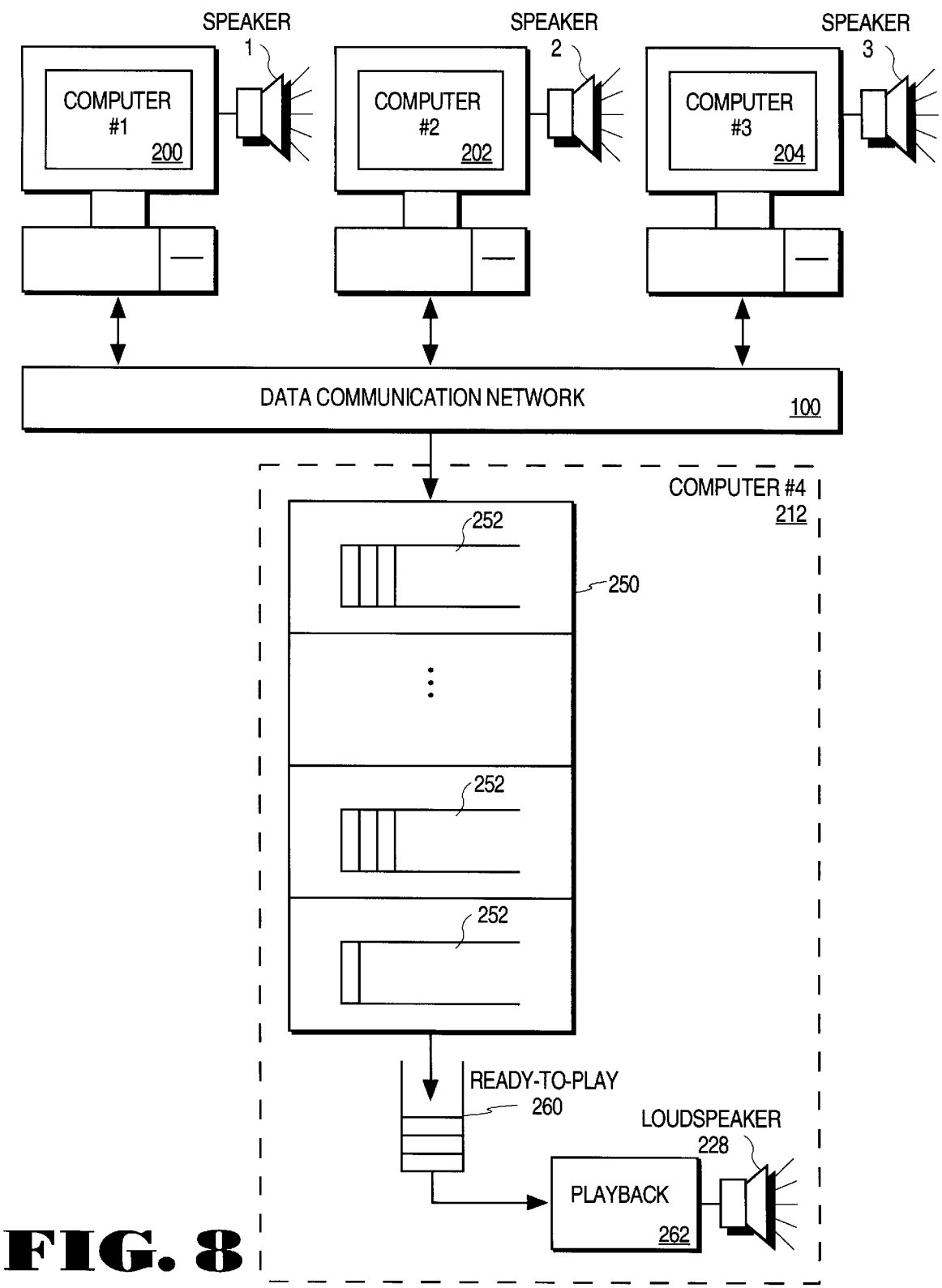
FIG. 8 illustrates data flow through a communication system according to the present invention.

FIG. 8 illustrates the data flow of an embodiment of the present invention which reduces latency. A separate queue is created for each utterance to store audio packets, without regard to the transmitting station which generated the utterance. This is in contrast with the method of FIG. 2, in which a separate queue is provided for each transmitting station. In particular, a number of "utterance queues" 252 are created, each corresponding to a different utterance from one of the transmitting stations 200, 202, or 204. Each of these utterance queues 252 is then placed in a larger queue, referred to herein as the "queue of queues" 250 (i.e, a queue for storing other queues). The utterance queues 252 are placed in the queue of queues 250 based on the order in which each utterance was received, as determined by the sequencing mechanism 242. One of the utterance queues 252 in the queue of queues 250 is "granted the floor." The act of granting an utterance the floor is essentially equivalent to designating one of the utterances as a ready-to-output utterance. Audio packets associated with the utterance which has the floor are immediately provided to an output queue, i.e., ready-to-play queue 260, as they are received by the receiving station 212. That is, packets of the utterance which has the floor are moved immediately from the utterance queue to the ready-to-play queue in real-time. Packets in the ready-to-play queue 260 are then immediately sent to the playback routine 262, which generates audio output from the loudspeaker 228.

Figure 9:
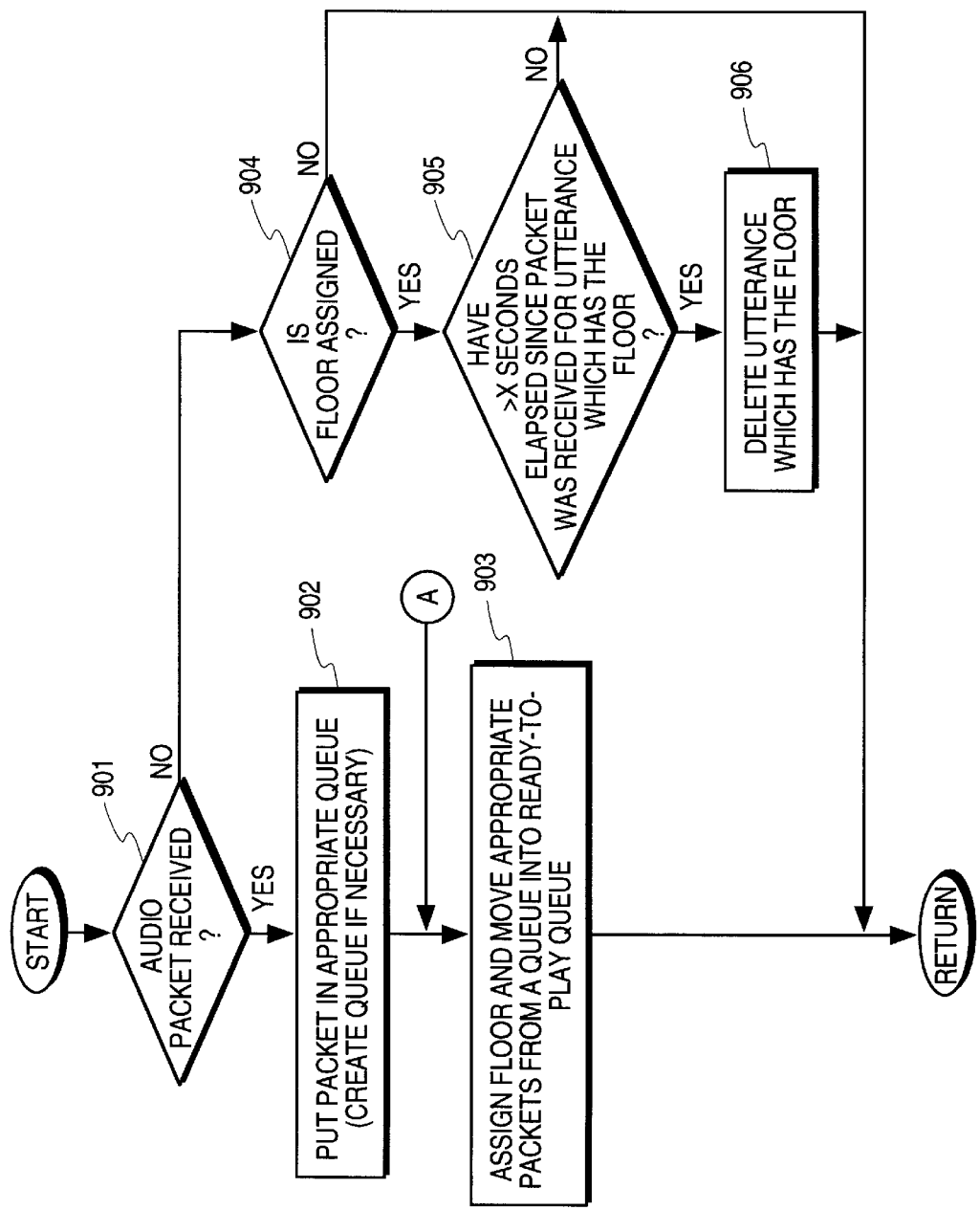
FIG. 9 is a flow diagram illustrating an overall routine for implementing a chat session with low latency in a receiving station.

FIG. 9 illustrates the overall routine of the embodiment of FIG. 8. Initially, it is determined whether an audio packet has been received (step 901). If so, the audio packet is placed in an appropriate utterance queue for a specific utterance according to a routine which is described below (step 902). This step may involve creating an utterance queue for an utterance if necessary (i.e., if a queue has not yet been created for that utterance). Next, the floor is assigned, and appropriate packets are moved from their utterance queue into the ready-to-play queue according to a routine which is also described below (step 903).

The routine then returns to step 310 in FIG. 3. If an audio packet has not been received (step 901), then a determination is made of whether the floor has been assigned (step 904). If the floor has not been assigned, the routine returns.

If the floor has been assigned (step 904), then a sequence of steps is performed to ensure that the floor will not remain assigned to an utterance for which an end-of-utterance packet was transmitted but lost somewhere en route. Specifically, it is determined how much time has elapsed since a packet was received for the utterance which has the floor (step 905). If more than a predetermined number X of seconds has elapsed, then the utterance which has the floor is deleted (step 906). Otherwise, the routine returns. The value of X can be empirically determined. However, the value of X should be much larger than the largest expected latency between packets.

Figure 10:
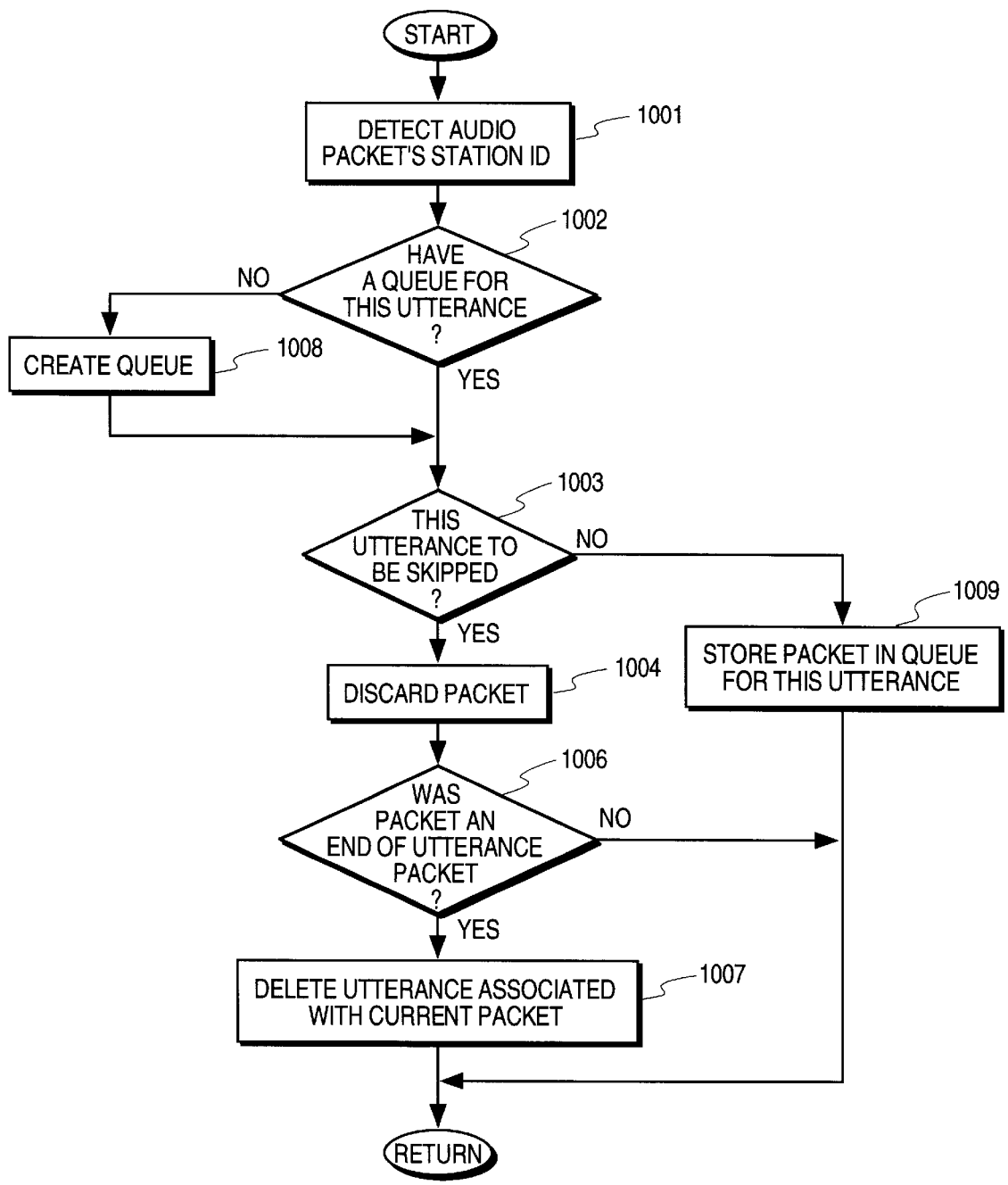
FIG. 10 is a flow diagram illustrating a routine for providing audio packets to an appropriate queue in a receiving station.

FIG. 10 illustrates in greater detail the routine for putting an audio packet in an appropriate queue (step 902). Initially, the received audio packet's station ID is detected (step 1001). Next, it is determined if the receiving station has an existing utterance queue for that utterance (step 1002). If not, an utterance queue is created for that utterance (step 1008). If there is an utterance queue for that utterance, then it is determined whether the utterance is to be skipped (step 1003). An utterance may be skipped in response to a user input in a manner which will be described below. This feature may be desirable for situations when a speaker is rambling, for example. If the utterance is not to be skipped, then the received packet is stored in the utterance queue designated for that utterance (step 1009), and the routine returns. If the utterance is to be skipped (step 1003), then the received packet is discarded (step 1004). In addition, after the packet is discarded, it is determined whether the packet was an end-of-utterance packet (step 1006). If the packet was not an end-of-utterance packet, the routine returns. If the discarded packet was an end-of-utterance packet, then the utterance (i.e., the queue) associated with the current packet is deleted (step 1007), and the routine then returns.

Figure 11:
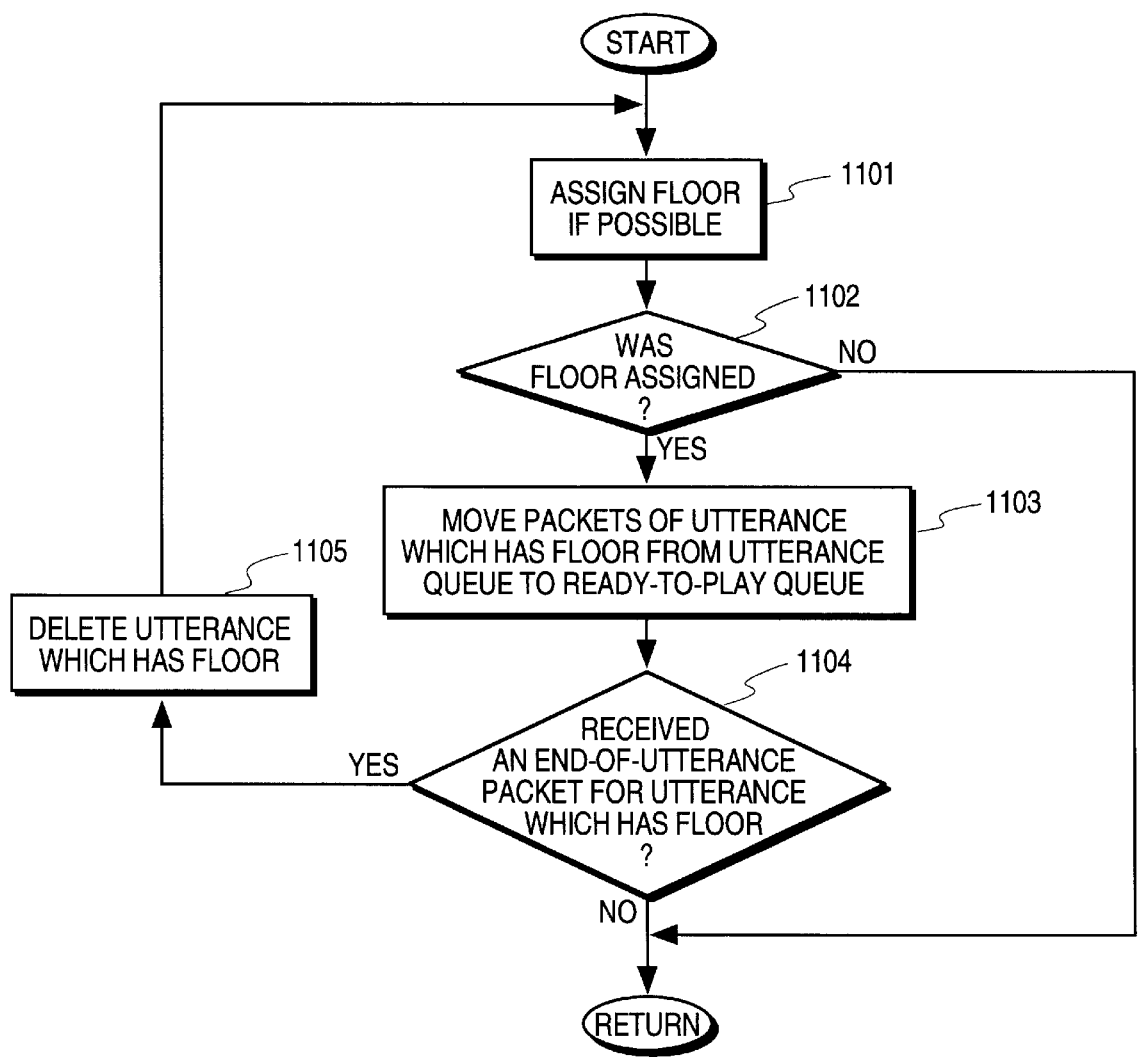
FIG. 11 is a flow diagram illustrating a routine for moving appropriate audio packets from a received utterance to a "ready-to-play" queue.

FIG. 11 illustrates in greater detail the routine for assigning the floor and moving appropriate packets from an utterance queue into the ready-to-play queue 260 (step 903). Initially, the floor is assigned (step 1101), if possible, in a manner which is described below. Note that under certain conditions the floor will not be assigned. Next, it is determined whether the floor was assigned (step 1102). If the floor was not assigned, then the routine returns. If the floor was assigned, then packets of the utterance which has the floor are moved from the queue corresponding to that utterance to the ready-to-play queue (step 1103). Next, it is determined whether an end-of-utterance packet has been received for the utterance which has the floor (step 1104). If not, the routine returns. If so, then the utterance which has the floor is deleted (step 1105).

In all cases, packets from the utterance which has the floor are moved to the ready-to-play queue in real-time. That is, the packets are moved immediately from the their assigned utterance queue to the ready-to-play queue.

Figure 12:
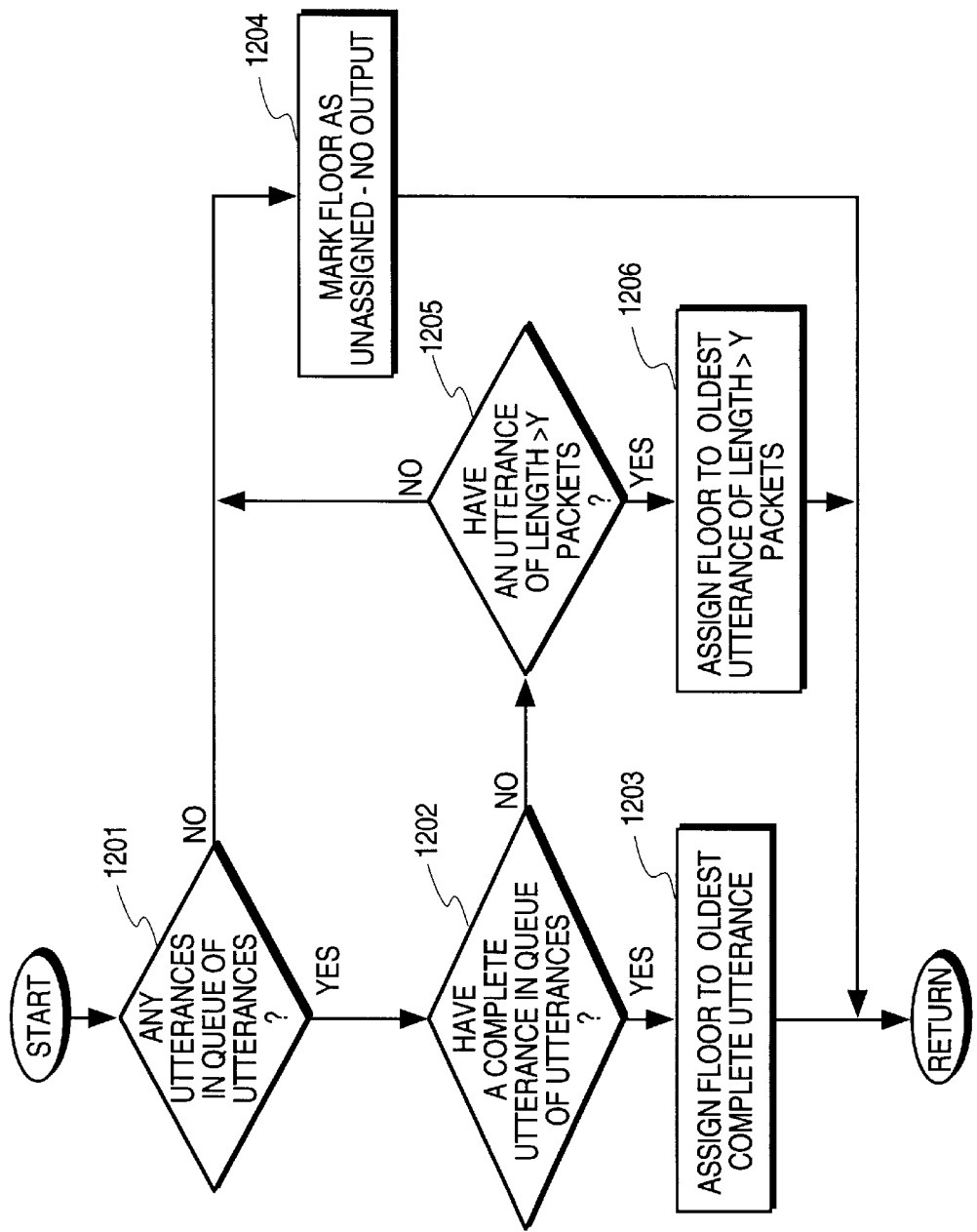
FIG. 12 is a flow diagram illustrating a routine for assigning the floor to a received utterance.

FIG. 12 illustrates a routine for assigning the floor to a given utterance. Initially, it is determined whether any utterances are present in the queue of queues 250 (step 1201). If not, the floor is marked as being unassigned, and no output is sent to the ready-to-play queue 260 (step 1204). The routine then returns. If any utterances are present in the queue of queues 250, then it is determined whether there is at least one complete utterance in the queue of queues 250 (step 1202). If there is no complete utterance in the queue of queues 250, then if there is an utterance having a length greater than a predetermined number Y of packets (step 1205), the floor is assigned to the oldest such utterance (step 1206). If there is no complete utterance (step 1202) and there is no partial utterance longer than Y packets (step 1205), then the floor is marked as being unassigned and no output is sent to the ready-to-play queue 260 (step 1204), and the routine then returns. If (in step 1202) there is a complete utterance 252 in the queue of queues 250, then the floor is assigned to the oldest complete utterance in the queue of queues 250 (step 1203). The routine then returns.

Factors to be considered in determining the number Y of packets include the variability in latency between packets between two locations. The value of Y should be set large enough to cover the greatest latency that is expected. Such variability may be caused, for example, by the load on the network at a given point in time. If there is no such variability, then the number Y of packets can be set equal to 1.

Figure 13:
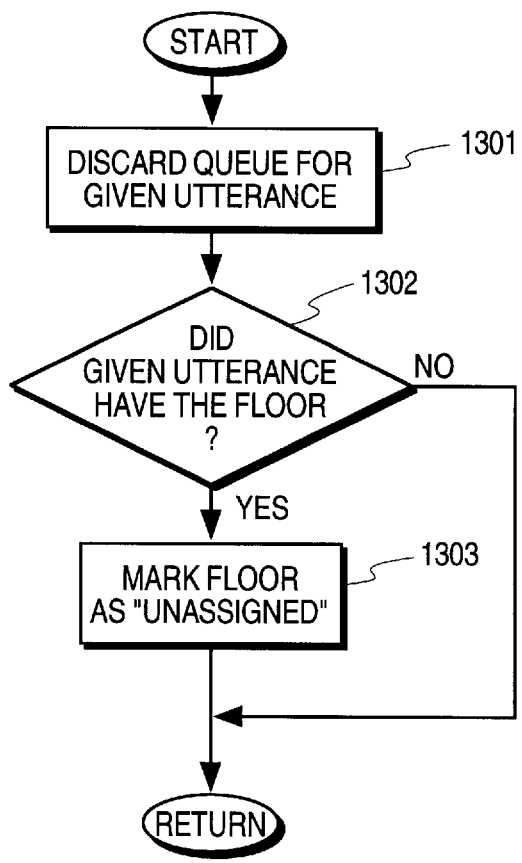
FIG. 13 is a flow diagram illustrating a routine for deleting an utterance.

FIG. 13 illustrates a routine for deleting a given utterance. Initially, when an utterance is to be deleted, the utterance queue for that utterance is discarded (step 1301). If that utterance had the floor (step 1302), then the floor is marked as "unassigned" (step 1303). Otherwise, the routine returns.

Figure 14A:
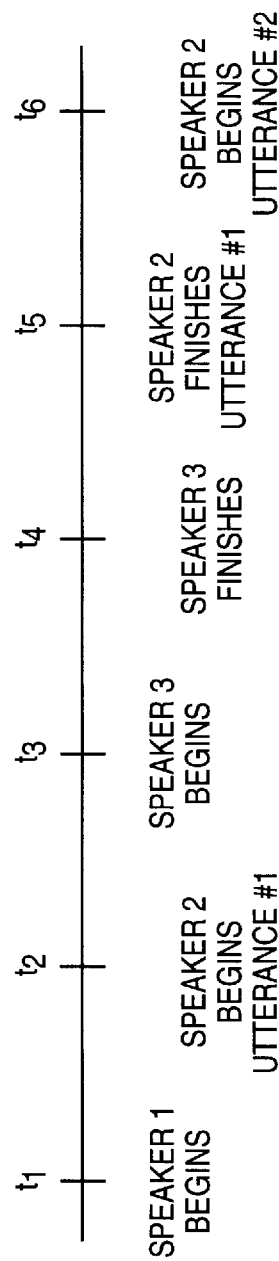
FIG. 14A illustrates a timeline showing a chronology of several utterances of audio data.

An example of the operation of the present invention is now illustrated with reference to FIGS. 14A and 14B. FIG. 14A illustrates a chronological sequence of utterances, as determined by the sequencing mechanism 242 (see FIG. 7). At time $t_1$ Speaker 1 begins an utterance. At time $t_2$ Speaker 2 begins a first utterance. At time $t_3$ Speaker 3 three begins an utterance. At time $t_4$ Speaker 3 finishes his utterance. At time $t_5$ Speaker 2 finishes his first utterance. Finally, at time $t_6$ Speaker 2 begins a second utterance. Note that during this sequence, Speaker 1 has not finished his utterance, and Speaker 2 has not finished his second utterance.

Figure 14B:
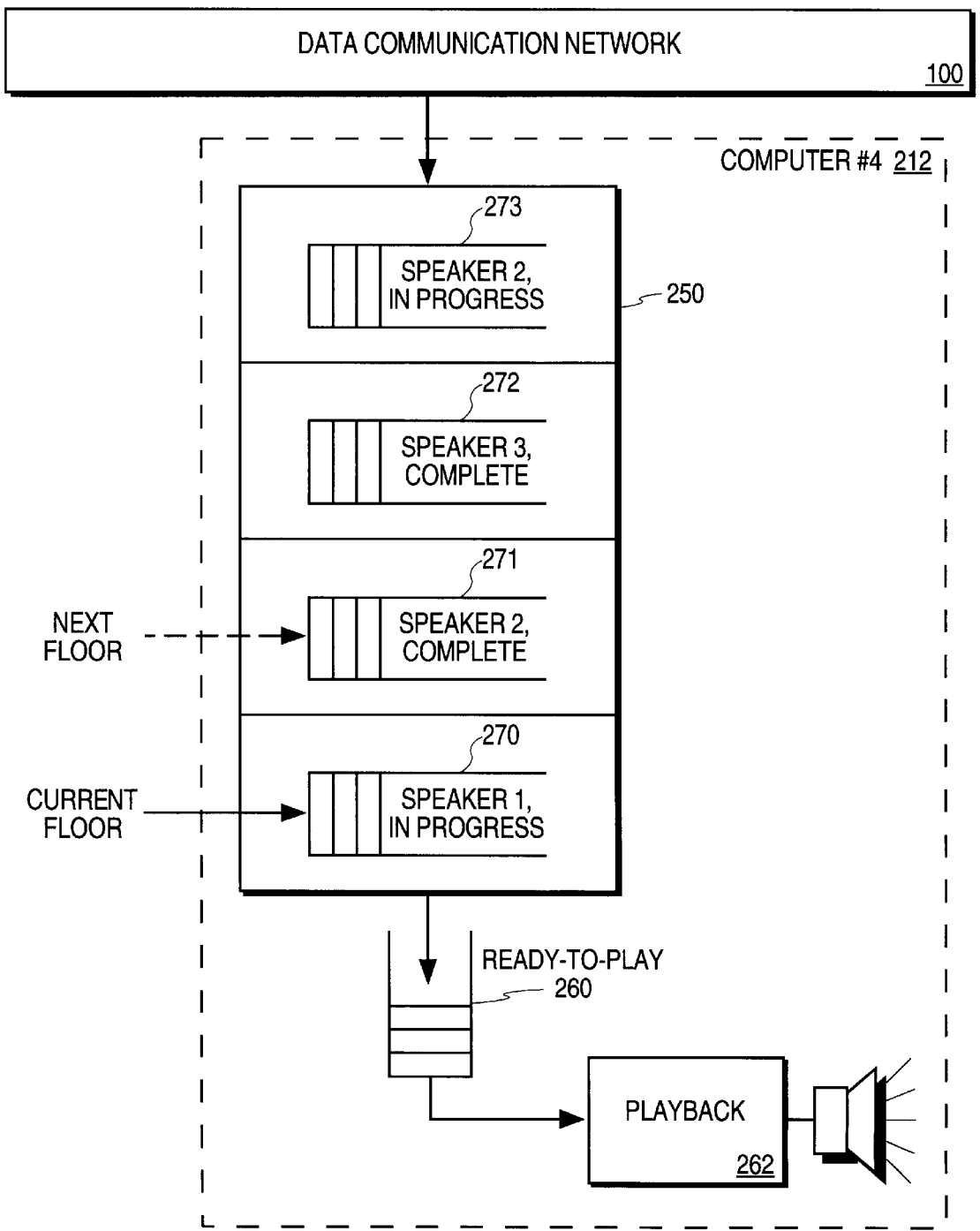
FIG. 14B illustrates data flow according to the present invention of the utterances of FIG. 14A.

Referring now to FIG. 14B, the utterances of FIG. 14A are handled as follows in the receiving station 212. Each of the utterances from Speakers 1, 2, and 3 is stored in a different utterance queue within the queue of queues 250. In particular, the queue of queues 250 contains the incomplete utterance 270 of Speaker 1, the first complete utterance 271 of Speaker 2, the complete utterance 272 of Speaker 3, and the incomplete utterance 273 of Speaker 2. At time $t_1$, when Speaker 1 begins speaking, the floor becomes assigned to utterance 270 of Speaker 1. The floor remains assigned to utterance 270 as long as the time period between received data packets does not exceed the predetermined time limit (X seconds) referred to in connection with FIG. 9 (step 905). Data packets corresponding to utterance 270 of Speaker 1 are provided directly to the ready-to-play queue 260 as they are received from the data communication network 100.

After all data packets from utterance 270 have been provided to the ready-to-play queue 260 (i.e., after the utterance has been completed), then the floor will be reassigned to a new utterance. In this case, the floor will be assigned to the oldest complete utterance in the queue of queues 250 (as noted in connection with FIG. 12).

Specifically, the floor will next be assigned to utterance 271, the first utterance of speaker number two. As soon as the floor becomes assigned to utterance 271, all of the data packets from utterance 271 are transferred to the ready-to-play queue 260. Note that if the floor were to be assigned to an utterance which is not yet complete, then all packets stored in the queue for that utterance would be immediately transferred to the ready-to-play queue 260, and all packets subsequently received for that utterance would be immediately transferred to the ready-to-play queue 260 upon receiving such packets from the data communications network 100.

Figure 15:
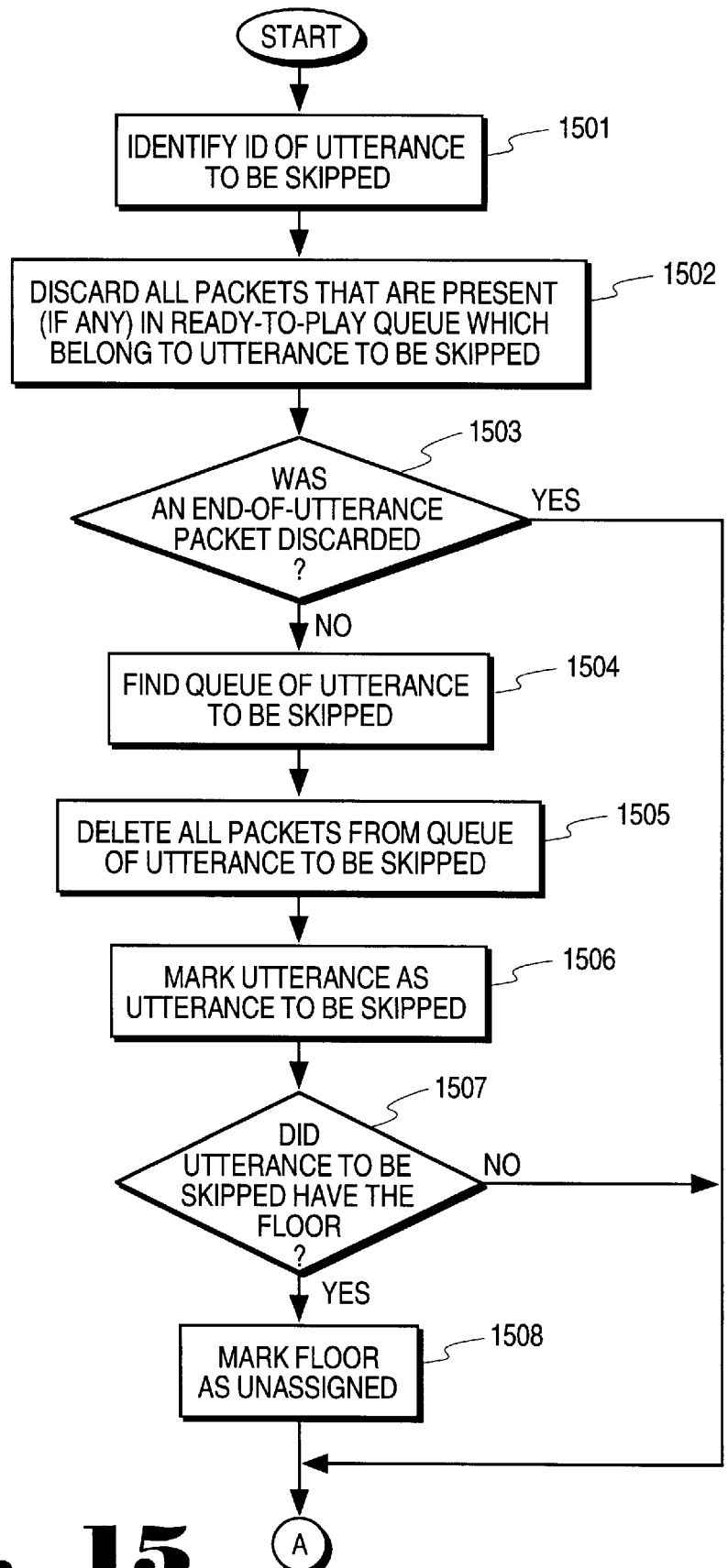
FIG. 15 is a flow diagram illustrating a routine for skipping an utterance.

As noted above, a particular utterance may be skipped over in response to a user input. In particular, if a listener is receiving output from the loudspeaker 228 and no longer wishes to hear output associated with that utterance, the user can activate a control which will cause the remainder of that utterance to be skipped. FIG. 15 illustrates a routine for skipping an utterance (the "utterance-to-be-skipped") in response to such a user input.

Initially, the ID of the utterance-to-be-skipped is identified (step 1501). Next, all packets which belong to the utterance-to-be-skipped that are present in the ready-to-play queue 260 (if any) are discarded (step 1502). If an end-of-utterance packet was one of the packets which was discarded, this means that the complete utterance had already been transferred to the ready-to-play queue 260; consequently, the routine returns (step 1503). If an end-of-utterance packet was not discarded, then the utterance queue corresponding to the utterance-to-be-skipped is identified (step 1504), and all packets from that utterance queue are deleted (step 1505). That utterance is then marked as an utterance-to-be-skipped (step 1506). If the utterance-to-be-skipped did not have the floor (step 1507), then the routine returns. If, however, the utterance-to-be-skipped did have the floor, then the floor is marked as "unassigned" (step 1508), the floor is assigned, and appropriate packets are moved from one of the utterance queues to the ready-to-play queue 260 (FIG. 9, step 903).

Another technique which may be used in accordance with the present invention, is a technique by which the listener at a receiving station can vary the speed of playback of audio output by activating a control input. The control may be provided through a graphical user interface on the receiving station. Such a feature is useful in various situations, such as when a particular speaker is speaking very quickly. Accordingly, the listener can slow down audio that is output from the ready-to-play queue 260 to a comfortable rate.

Thus, a method has been described of, in a receiving station, managing data received from a plurality of transmitting nodes. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. In a receiving node coupled to a plurality of transmitting nodes, a method of managing data received from the transmitting nodes, the method comprising the steps of:

receiving a plurality of transmissions, each transmission transmitted from a different one of the transmitting nodes, each transmission representing one complete utterance of audio information that includes a plurality of data packets;

designating one of the transmissions as a ready-to-output transmission;

providing data packets of the ready-to-output transmission to an output queue in real time; and delaying providing any of the others of said transmissions to the output queue until after all of the packets of the ready-to-output transmission have been provided to the output queue.

2. A method of enabling a target computer to manage data received from a plurality of transmitting nodes, the method comprising the step of transmitting sequences of instructions from a host computer to the target computer, the sequences of instructions including instructions which, when executed on the target computer, cause the target computer to perform the method recited in claim 1.

3. A method according to claim 1, wherein each transmission has an unadjusted speed, the method further comprising the steps of:

receiving a command for controlling a playback speed of the ready-to-output transmission; and outputting, based on the command, the audio information of the ready-to-output transmission at a playback speed that is different from the unadjusted speed.

4. A method according to claim 1, wherein the designating step is based on a chronological order in which the transmissions are received.

5. A method according to claim 1, wherein the designating step is based on a priority of the ready-to-output queue.

6. A method according to claim 1, further comprising the steps of:

receiving a skip command, the skip command specifying one of the transmissions; and in response to the skip command, discarding all packets associated with the specified transmission.

7. In a receiving station coupled to a plurality of transmitting stations by a data communication network, a method of managing data received from the transmitting stations, the method comprising the steps of:

(a) receiving a plurality of sets of data, each set including a plurality of data packets;

(b) assigning a sequence to the sets of data with respect to a single time base;

(c) designating one of the sets of data as a ready-to-output set based on a predetermined criterion;

(d) providing data packets of the ready-to-output set to an output queue on a packet-by-packet basis;

(e) after all data packets of the ready-to-output queue have been provided to the output set, (i) designating another one of the sets of data as the ready-to-output set; and (ii) repeating step (d).

8. A method for enabling a target computer to manage data received from a plurality of transmitting stations, the method comprising the step of transmitting sequences of instructions from a host computer to the target computer, the sequences of instructions including instructions which, when executed on the target computer, cause the target computer to perform the method recited in claim 7, wherein the target computer is the receiving station.

9. A method according to claim 7, further comprising the step of assigning a sequence to the sets of data with respect to a single time base, wherein the predetermined criterion corresponds to the sequence of the sets of data.

10. A method according to claim 7, wherein the step of designating one of the sets of data as a ready-to-output set is based on a chronological order in which the sets are received.

11. A method according to claim 8, wherein each set represents one utterance of audio information.

12. A method according to claim 11, wherein each set has a normal speed corresponding to a speed at which such set was input at a transmitting station, the method further comprising the steps of:

receiving a command for controlling an output speed of the ready-to-output set; and outputting, based on the command, the audio information of the ready-to-output set at an output speed that is different from the normal speed of the ready-to-output set.

13. A method according to claim 7, the designating step (c) is based on a chronological order in which the sets are received.

14. A method according to claim 7, further comprising the steps of:

(f) receiving a skip command, the skip command specifying one of the sets; and (g) in response to the skip command, discarding all packets associated with the specified set.

15. A method of enabling a receiving computer to manage data received from a plurality of transmitting nodes, the receiving node including a sequencing mechanism for assigning a sequence to a plurality of input transmissions relative to a single time base, the method comprising the step of transmitting sequences of instructions including instructions which, when executed on the receiving computer, cause the receiving computer to perform the steps of:

(a) receiving the plurality of transmissions, each transmission transmitted from a different one of the transmitting nodes and including a plurality of data packets;

(b) designating only one of the transmissions as a ready-to-output transmission based on the sequence;

(c) after said designating step, providing each subsequently received data packet of the ready-to-output transmission to an output queue immediately upon receiving each said subsequently received data packet and deferring providing data packets of any others of said transmissions to the output queue while an end-of-transmission packet has not been received for the ready-to-output transmission; and (d) designating a different one of the transmission as the ready-to-output queue based on the sequence; and (e) repeating step (c).

16. In a receiving station coupled to a plurality of transmitting stations by a data communication network, a method of managing audio data received from the transmitting stations, the method comprising the steps of:

receiving a plurality of complete utterances of audio data from the transmitting stations, each utterance originating from a different one of the transmitting stations, each utterance including a plurality of audio packets;

designating one of the utterances as a ready-to-play utterance;

providing audio packets of the ready-to-play utterance to a ready-to-play queue on a packet-by-packet basis as the audio packets of the ready-to-play utterance are received;

deferring providing any of the audio packets of any of said utterances not designated as the ready-to-play utterance to the output queue until all audio packets of the ready-to-output utterance have been provided to the ready-to-play queue; and after providing the audio packets of the ready-to-play utterance to the ready-to-play queue, designating a second one of the utterances as the ready-to-play utterance.

17. A method according to claim 16, further comprising the step of determining a chronological sequence for the utterances relative to a given time base, wherein the step of designating one of the utterances as a ready-to-play utterance comprises the step of designating said one of the utterances as the ready-to-play utterance based on the chronological sequence.

18. A method according to claim 16, the step of designating one of the utterances as a ready-to-play utterance comprises the steps of:

determining whether any of the received utterances is a complete utterance;

if any of the utterances is a complete utterance, then designating as the ready-to-play utterance the oldest complete utterance; and if none of the utterances is a complete utterance, then designating as the ready-to-play utterance the oldest utterance which exceeds a predetermined length.

19. A method according to claim 16, wherein the step of designating one of the utterances as a ready-to-play utterance comprises the step of designating said one of the utterances as the ready-to-play utterance based on a predetermined priority scheme.

20. In a receiving station coupled to a plurality of transmitting stations by a data communication network, a method of managing audio data received from the transmitting stations, the method comprising the steps of:

creating a plurality of audio data queues for holding audio data received from the transmitting stations, the plurality of audio data queues including one audio data queue for each transmitting station;

creating a ready-to-play queue for holding audio data to be output from the receiving station;

receiving a plurality of complete utterances of audio data from the transmitting stations, each utterance originating from a different one of the transmitting stations, each utterance including a plurality of audio packets;

placing each of the audio packets of the received utterances in a corresponding one of the audio data queues;

designating one of the utterances as a ready-to-play utterance, and transferring audio packets of only the ready-to-play utterance to the ready-to-play queue on a packet-by-packet basis until all audio packets of the ready-to-play utterance have been transferred to the ready-to-play queue; and designating a different one of the utterances as the ready-to-play utterance.

21. A program storage device readable by a machine, the program storage device tangibly embodying a program of instructions executable by the machine to perform method steps for enabling a receiving node coupled to a plurality of transmitting nodes to manage data received from the transmitting nodes, the method steps comprising:

receiving a plurality of transmissions, each transmission transmitted from a different one of the transmitting nodes, each transmission representing one complete utterance of information that includes a plurality of data packets;

designating one of the transmissions as a ready-to-output transmission, and providing data packets of the ready-to-output transmission to an output queue in real time; and delaying providing any of the others of said transmissions to the output queue until after all of the packets of the ready-to-output transmission have been provided to the output queue.

22. A program storage device according to claim 21, wherein each transmission comprises audio data representing a single utterance of a speaker.

23. A program storage device according to claim 22, wherein each transmission has an unadjusted speed, the method steps further comprising:

receiving a command for controlling a playback speed of the ready-to-output transmission; and outputting the audio data of the ready-to-output transmission at a playback speed that is different from the unadjusted speed based on the command.

24. A program storage device according to claim 21, wherein the receiving node comprises a sequencing mechanism for receiving the transmissions and for attributing a chronological sequence to the transmissions, wherein the step of designating one of the transmissions as a ready-to-output transmission comprises the step of designating one of the transmissions as a ready-to-output transmission based on the sequence.

25. A program storage device according to claim 21, wherein the step of designating one of the transmissions as a ready-to-output transmission comprises the step of designating one of the transmissions as a readyto-output transmission based on a predetermined priority scheme.

26. A program storage device according to claim 21, wherein the method steps further comprise the steps of:

receiving a skip command, the skip command specifying one of the transmissions; and in response to the skip command, discarding all packets associated with the specified transmission.

27. A program storage device according to claim 21, wherein the receiving node and at least one of the transmitting nodes are computer systems, wherein the computer systems are coupled together by a data communication network.

28. In a node coupled for communication of audio data with a plurality of other nodes, a method of managing received audio data, the method comprising:

receiving a plurality of transmissions of audio data from at least one of the other nodes, each of the transmissions representing one complete utterance;

designating one of the transmissions as a ready-to-output transmission;

providing the ready-to-output transmission to an output stage; and delaying providing the transmissions other than the ready-to-output transmission to the output stage until after the ready-to-output transmission has been provided in its entirety to the output stage.

29. A method according to claim 28, further comprising, after the ready-to-output transmission has been provided in its entirety to the output stage, designating another one of the transmissions as the ready-to-output transmission.

30. A method according to claim 28, further comprising the steps of:

receiving a skip command, the skip command specifying one of the transmissions; and in response to the skip command, discarding all packets associated with the specified transmission.

31. A method according to claim 28, wherein each transmission has an unadjusted speed, the method further comprising the steps of:

receiving a command for controlling a playback speed of the ready-to-output transmission; and outputting, based on the command, the audio information of the ready-to-output transmission at a playback speed that is different from the unadjusted speed.

32. A method according to claim 28, wherein the ready-to-output transmission comprises a plurality of audio packets, and wherein said providing the ready-to-output transmission to the output stage comprises providing the ready-to-output transmission to the output stage on a packet-by-packet basis, as the packets are received.

33. A method according to claim 28, wherein each of the transmissions originates from a different one of the other nodes.

34. A method according to claim 28, wherein the designating step is based on a chronological order in which the transmissions are received.

35. A method according to claim 28, wherein the designating step is based on a priority of the ready-to-output queue.

36. An apparatus for managing received audio data in a node capable of audio communication with a plurality of remote nodes, the apparatus comprising:

a communications interface for receiving a transmission from each of the remote nodes, each of the transmissions representing one complete utterance;

an output stage; and a prioritization mechanism configured to designate one of the received transmissions as a ready-to-output transmission, configured to provide the ready-to-output transmission to the output stage, and configured to delay providing the transmissions other than the ready-to-output transmission to the output stage until after the ready-to-output transmission has been provided in its entirety to the output stage.

37. An apparatus according to claim 36, wherein the prioritization mechanism is configured to designate another one of the transmissions as the ready-to-output transmission after the ready-to-output transmission has been provided in its entirety to the output stage.

38. An apparatus according to claim 37, wherein the ready-to-output transmission comprises a plurality of audio packets, and wherein said prioritization mechanism is configured to provide the ready-to-output transmission to the output stage on a packet-by-packet basis, as the packets are received.

39. An apparatus according to claim 38, wherein each of the transmissions originates from a different one of the other nodes.

40. An apparatus according to claim 36, further comprising a selective output mechanism, said output mechanism configured to:

receive a skip command, the skip command specifying one of the transmissions; and in response to the skip command, discard all the packets associated with the specified transmission.

41. An apparatus according to claim 36, wherein the prioritization mechanism is configured to designate each of the transmissions on a chronological order in which the transmissions are received.

* * * * *

UNITED STATES PATENT AND TRADEMARK OFFICE
CERTIFICATE OF CORRECTION

PATENT NO. : 5,889,764
DATED : March 30, 1999
INVENTOR(S) : Needham et al.

It is certified that error appears in the above-identified patent and that said Letters Patent is hereby corrected as shown below:

Column 11,
Line 17, delete "queue" and insert -- set --.
Line 18, delete "set" and insert -- queue --.

Signed and Sealed this

Second Day of December, 2003

JAMES E. ROGAN
*Director of the United States Patent and Trademark Office*